Jan. 2, 1968   R. M. CASE   3,361,468

FOOD TURNING TONGS AND THE LIKE

Filed April 11, 1966

INVENTOR

RALPH M. CASE

BY Roy A. Plant

ATTORNEY 3,361,468
FOOD TURNING TONGS AND THE LIKE
Ralph M. Case, 507 E. Erie St., Albion, Mich. 49224
Filed Apr. 11, 1966, Ser. No. 541,801
4 Claims. (Cl. 294—8)

ABSTRACT OF THE DISCLOSURE

These new food turning tongs utilize a unique form of upper and lower gripping means which are substantially parallel to each other when in food pattie holding and turning position, with these upper and lower members each having substantially parallel end portions of rod-like form with the end portions of the upper member being substantially symmetrical with the lower and approximately in alinement with same. The bottom of the points of the lower end portions are preferably chamfered, and the end portions of the upper members sinuous in an up and down direction with a turned-down gripping portion at the free end of same. Said turned-down gripping portion preferably having a turned-up point at its outer end.

---

The present invention relates broadly to culinary instruments, and more specifically to improved turning tongs for use in the broiling, grilling or frying of hamburgers, frankfurters and the like.

In the frying of fish fillets, hamburgers, sausage patties and the like, the commonly used turning instrument for such foods is in the form of a spatula with a sheet metal blade which requires flipping the food article in order to cook the opposite side of same with resultant splashing of cooking fat. To overcome this splashing of fat it has been proposed to use tongs having two flat sheet metal blades with spring actuated handles joining them, but this overlooks the fact that pieces of fish, meat patties and the like vary in thickness, with such tongs being parallel and thus ideal for gripping only one uniform thickness of such items with real thick or thin pieces being difficult to hold against slipping from between the blades, and if tighter gripping of the pieces is resorted to as a means of avoiding this slippage, then there is the inherent danger of breaking the hamburger, or other form of meat, in the handling of same. If a plain fork-ended pair of food turning tongs were to be resorted to, then the same gripping problem would be encountered as well as the additional difficulty of the ends of the prongs of the fork portion being blunt with resultant tearing of the partially cooked hamburger or other piece of meat when the prongs are forced under same. It was these and other difficulties in the use of the prior art devices which led to the conception and development of the present invention.

Accordingly, among the objects of this invention is the provision of an improved pair of tongs adapted for food turning during the handling and cooking of same, and which are particularly adapted for gripping and holding meat patties and the like more efficiently than tongs currently available for this purpose.

Another object of the present invention is to provide a pair of fork-ended tongs which have the under face of the ends of the prongs of the lower tong chamfered for ease of sliding along a cooking surface and under a meat patty or the like.

Another object of the present invention is to provide a pair of fork-ended tongs with the tip ends of the prongs of the upper tong turned down to better hold varying thickness meat patties when gripped for turning over in the course of cooking.

A further object of this invention is to provide a pair of fork-ended tongs wherein the upper tong has its prongs include multiple variation holding means, and preferably of moderate up and down sinuous construction, with the tip ends of same preferably turned down to thus provide for still better gripping of substantially flat items of food such as meat patties and fish filets when being turned over.

Still further objects and advantages of this invention will appear as the description proceeds.

To the accomplishment of the foregoing and related ends, the invention, then, consists of the tong features hereinafter fully described and particularly pointed out in the claims, the annexed drawing and the following description setting forth in detail certain illustrative embodiments of the invention, such disclosed embodiments illustrating, however, but several of various ways in which the principle of the invention may be used.

Figure 1:
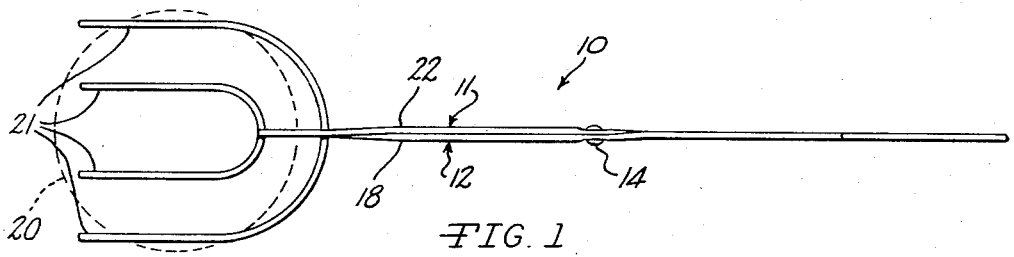
FIGURE 1 shows a top view of one preferred form of the pair of tongs of the present invention, with an article gripped thereby being shown in dashed lines.
Figure 2:
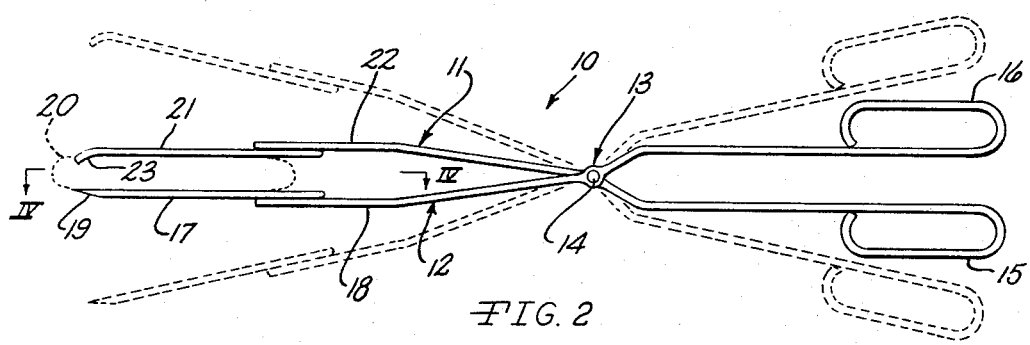
FIGURE 2 shows a side view of the pair of tongs illustrated in FIGURE 1, with the tongs in an open position being shown by dashed lines.

The pair of turning tongs 10, FIGURES 1 and 2, has an upper tong 11 and a lower tong 12 pivotally joined together by a conventional pivot means 13 having a pivot pin 14. Upper and lower tongs 11 and 12, respectively, have handle members 15 and 16 for use in the operation of same. These handle members may be of any suitable form although a preferred construction utilizes the reverse turned form, as shown, through which at least one finger and a thumb can be passed, like with a pair of scissors, for ease of operating the pair of tongs.

Figure 4:
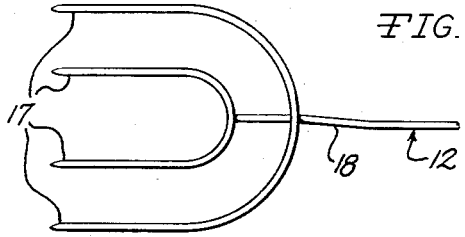
FIGURE 4 shows a fragmentary top view of the lower tong as taken along line IV—IV of FIGURE 2, looking in the direction of the arrows.

Now referring to FIGURE 4, it will be noted that the lower tong 12 is provided with a set of prongs 17 which, for convenience, may be of U-shape as shown and spot welded, brazed, or otherwise conventionally anchored rigidly on the end of body member 18 of lower tong 12 opposite to that carrying handle 16. These prongs 17, as shown in FIGURE 2, are preferably provided with bottom chamfered ends 19 for efficient passage under meat patties and the like 20 being fried or grilled on a substantially flat surface (not shown), and yet this chamfering does not interfere with use of the pair of tongs 10 in the handling of meat patties and the like being broiled on bars of an open grill (not shown) commonly used in the charcoal broiling of steaks, hamburgers, frankfurters and the like.

Figure 3:
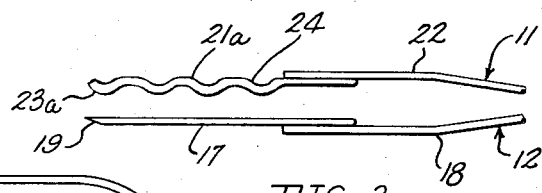
FIGURE 3 is a fragmentary side view illustrating a modified form of the gripping portion of the tongs shown in FIGURE 2.

Upper tong 11, FIGURES 1 and 2, is provided with a set of prongs 21 which, in preferred construction, are of U-shape and substantially of the same size as prongs 17 of lower tong 12 and positioned directly adjacent same for firm gripping of patties 20 and the like, as shown. These prongs 21, similarly to prongs 17 may, for convenience of manufacture, be spot welded, brazed, or otherwise conventionally anchored rigidly on the end of body member 22 of upper tong 11 opposite to that carrying handle 15. These prongs 21, FIGURE 2, are preferably provided with downturned outer ends 23 which, if desired, may have upwardly reverse bent tips 23a, as shown in FIGURE 3. By downturning the outer ends 23 of prongs 21, they will better hold a meat patty and the like 20 which is a little thicker than the average thickness patty where lower prongs 17 would be substantially parallel to the set of upper prongs 21. Reverse bending of prong ends 23a also facilitates smooth releasing of the meat patty and the like 20 after same has been turned over.

To facilitate still better gripping of a frankfurter, meat patty or the like 20, during the turning of same, a modified construction of the upper tong prongs may be utilized as shown in FIGURE 3. Here the upper set of tong prongs 21a may be made with multiple up and down holding means variations 24, for instance, sinuously as illustrated. These up and down variations 24 are approximately in the range of $1/16$ inch to $3/16$ inch, and preferably about $1/8$ inch with 10-inch to 12-inch long tongs. Where, as shown in FIGURE 2, a turned down end 23 on upper prong 21 is used, this end normally does not extend downward more than about $3/16$ inch, and preferably approximately $1/8$ inch where the pair of tongs 10 are about 10 inches to 12 inches long.

While directional terms such as "upper," and "lower" have been used in connection with describing this invention in the position shown in the drawing, such are not to be considered as a limitation on the claims to the invention in the light of its obvious spirit and scope.

Other modes of applying the principle of my invention may be employed instead of those explained, change being made as regards the tongs herein disclosed, provided the means stated by any of the following claims or the equivalent of such features be employed.

I therefore particularly point out and distinctly claim as my invention:

1. A food turner in the form of a pair of tongs with each tong of same having operating handle means on one end, food gripping means at the other end, and a pivot means between said handle means and said food gripping means joining said tongs together to form a pair of tongs so that actuation of said handle means at one end of said pair will simultaneously operably actuate said food gripping means at the other end thereof, said food gripping means having separate upper and lower sets of multiple prongs facing each other with at least one of said sets of multiple prongs having inturned gripping means, wherein said upper set of multiple prongs is provided with multiple variation holding means to facilitate gripping of items between said upper and lower sets of multiple prongs under conditions of operation, said inturned gripping means being on said upper set of multiple prongs, and wherein said multiple variation holding means is in the form of an up and down substantially sinuous surface on the gripping face of said upper set of multiple prongs, said inturned gripping means has an upward reverse bend at its end, and the ends of said lower set of multiple prongs are chamfered on their lower edge.

2. A food turner as set forth in claim 1, wherein the extending end portion of each of said upper and lower sets of multiple prongs are fork-ended with the individual prongs of each set substantially parallel to each other, said upper set also being substantially symmetrical with said lower set as well as in alinement with and overlapping same.

3. A food turner as set forth in claim 1, wherein the substantially sinuous surface on the gripping face of said upper set of multiple prongs are up and down variations which are approximately in the range of $1/16$ inch to $3/16$ inch in height.

4. A food turner as set forth in claim 3, wherein the extending end portion of each of said upper and lower sets of multiple prongs are fork-ended with the individual prongs of each set substantially parallel to each other, said upper set also being substantially symmetrical with said lower set as well as in alinement with and overlapping same.

References Cited

UNITED STATES PATENTS

| | | | |
|---|---|---|---|
| 149,836 | 4/1874 | Connelly | 294—118 X |
| 1,277,946 | 9/1918 | Kenkel | 294—3 |
| 1,326,570 | 12/1919 | Burmeister | 294—8 |
| 2,643,151 | 6/1953 | Zupancic | 294—18 |

FOREIGN PATENTS 36,591    4/1911    Sweden.

GERALD M. FORLENZA, *Primary Examiner.*

G. F. ABRAHAM, *Assistant Examiner.*